United States Patent [19]

Kassai

[11] Patent Number: 4,515,389
[45] Date of Patent: May 7, 1985

[54] BABY CARRIAGE AND ARMREST FOR SUCH BABY CARRIAGE

[75] Inventor: Kenzou Kassai, Osaka, Japan

[73] Assignee: Kassai Kabushikikaisha, Osaka, Japan

[21] Appl. No.: 490,489

[22] Filed: May 2, 1983

[30] Foreign Application Priority Data

May 21, 1982 [JP] Japan ................................. 57-86935

[51] Int. Cl.³ ............................................. B62B 7/06
[52] U.S. Cl. ................................... 280/642; 280/650;
280/658; 297/35; 297/417
[58] Field of Search ....................... 297/35, 38, 40, 41,
297/115, 417, DIG. 4; 280/47.38, 47.4, 642,
644, 647, 649, 650, 657, 658

[56] References Cited

U.S. PATENT DOCUMENTS

| | | | |
|---|---|---|---|
| 3,063,729 | 11/1962 | Hamilton | 280/650 |
| 3,421,774 | 1/1969 | Patterson | 280/642 |
| 3,459,435 | 8/1969 | Garner | 280/644 |
| 3,901,528 | 8/1975 | Miyagi | 280/644 |
| 4,293,144 | 10/1981 | Ida | 280/644 |
| 4,428,598 | 1/1984 | Kassai | 280/42 |

Primary Examiner—Joseph F. Peters, Jr.
Assistant Examiner—Mark C. Dukes
Attorney, Agent, or Firm—W. G. Fasse; D. H. Kane, Jr.

[57] ABSTRACT

In a collapsible baby carriage having front legs (10) and rear legs (14) adapted to pivot toward each other when the baby carriage is to be folded or collapsed, handrails or armrest (28) are provided which project forwardly from the front legs (10) of the baby carriage. Each handrail or armrest (28) has a front member (48) and a rear member (49), the rear member (49) being fixed to the front leg (10). The front member (48) is connected to the rear member (49) by a pivot pin (50) so that it can be pivoted downwardly. When the rear leg (14) moves toward the front leg (10) as the baby carriage is collapsed or folded, the front member (48) pivots downwardly in operative association with the pivoting, folding movement of the rear leg (14), whereby the handrail or armrest (28) itself is folded.

5 Claims, 8 Drawing Figures

FIG. 2
FIG. 3
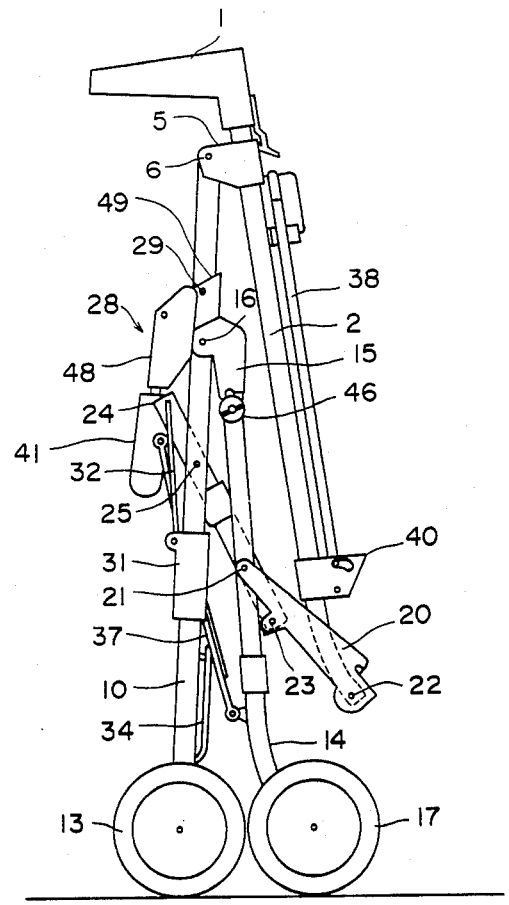
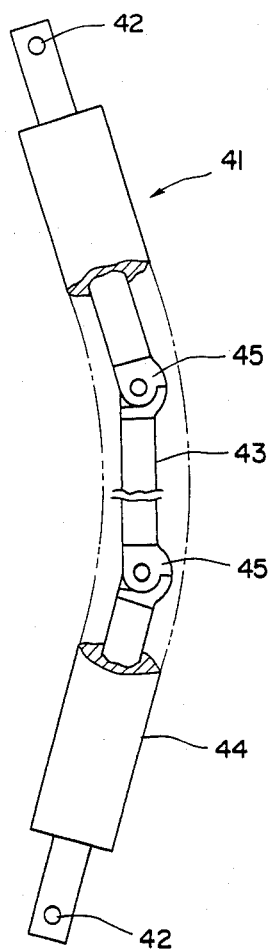

BABY CARRIAGE AND ARMREST FOR SUCH BABY CARRIAGE

BACKGROUND OF THE INVENTION

1. Field of the Invention

This invention relates to a baby carriage with a special handrail or armrest and more particularly to a handrail or armrest for a baby carriage extending forwardly from the baby carriage main body and positioned on each side of a baby sitting in the baby carriage.

2. Description of the Prior Art

It is preferable from the standpoint of safety to provide handrails at the seat for a baby in a baby carriage. Such handrails are sometimes arranged so that they project forwardly when the baby carriage is in the opened state. If the baby carriage is collapsible, it is desirable that when the baby carriage is closed or folded, the handrails change their projecting state so that they are snugly received in the space occupied by the entire baby carriage. To this end, it is necessary to provide a mechanism whereby when the baby carriage is folded, the handrails which are projecting from the baby carriage in the opened or unfolded state, are suitably turned or displaced to be received in the space of the entire baby carriage.

As an example of such mechanism, there may be contemplated an arrangement wherein the handrails are turnably attached to the baby carriage main body so that when the baby carriage is closed, the handrails are turned, e.g., downwardly to hang down so as not to project beyond the longitudinal extent of the baby carriage. However, even if such mechanism is employed, the problem may not sometimes be completely solved. That is, the handrails, because of their function, require a substantial length, and turning such a relatively long body would involve some limiting conditions. For example, in order to turn such relatively long handrails without any trouble, a relatively large space is required and hence the components of the baby carriage must be positioned outside the space which is required for the turning of the handrails. Further, while the handrails must be turned and received in the space of the entire baby carriage when the baby carriage is closed, there is a limit to such reception where the handrails are long.

SUMMARY OF THE INVENTION

Accordingly, a principal object of this invention is to provide a construction for handrails for a baby carriage which is capable of solving the problem described above.

In brief, this invention resides in dividing both, the right and left handrail itself into a front member and a rear member and fixing the rear member to the baby carriage main body while turnably connecting the front member to the rear member by a handrail pivot pin extending widthwise of the baby carriage, thereby making the handrail itself collapsible.

According to the invention, since both handrails are collapsible, they can extend in the horizontal direction only when the handrails are in the stretched out, horizontal position, but when the handrails are not required to function as handrails, as when the baby carriage is folded, the handrails can be collapsed by utilizing the collapsing mechanism described above. Therefore, even if the handrails are relatively long, in the closed state of the baby carriage, they can be snugly received in the space of the entire baby carriage. Further, although the collapsing of the handrails involves a turning movement, such a movement takes place only in the front member of each handrail. The front members are approximately half as long as the entire handrails. Thus, the space required for turning the front member is less than when turning the handrail in its entire length. Therefore, the probability that the handrail inteferes with the components of the baby carriage main body is low and hence the limiting conditions imposed on the arrangement of the components are not so severe.

In a preferred embodiment of this invention, the turning movement of the front members of the handrails is operatively associated with the collapsing or folding movement of the baby carriage main body. For example, in a baby carriage including front legs and rear legs connected to the front legs so that the rear legs are turned in response to the collapsing movement, the relative turning movement of the rear legs with respect to the front legs is transmitted to the front members, whereby the movement of the rear legs is operatively associated with the movement of the front members.

Other objects and features of this invention will become more apparent from the following detailed description referring to the drawings.

BRIEF DESCRIPTION OF THE DRAWINGS

FIG. 2 is a right-hand side view of the baby carriage of FIG. 1 in its closed or folded state;

FIG. 3 is a plan view, partly broken away, of an example of the arrangement of a torso guard installed between a pair of handrails;

DESCRIPTION OF THE PREFERRED EMBODIMENTS AND OF THE BEST MODE OF THE INVENTION

Figure 1:
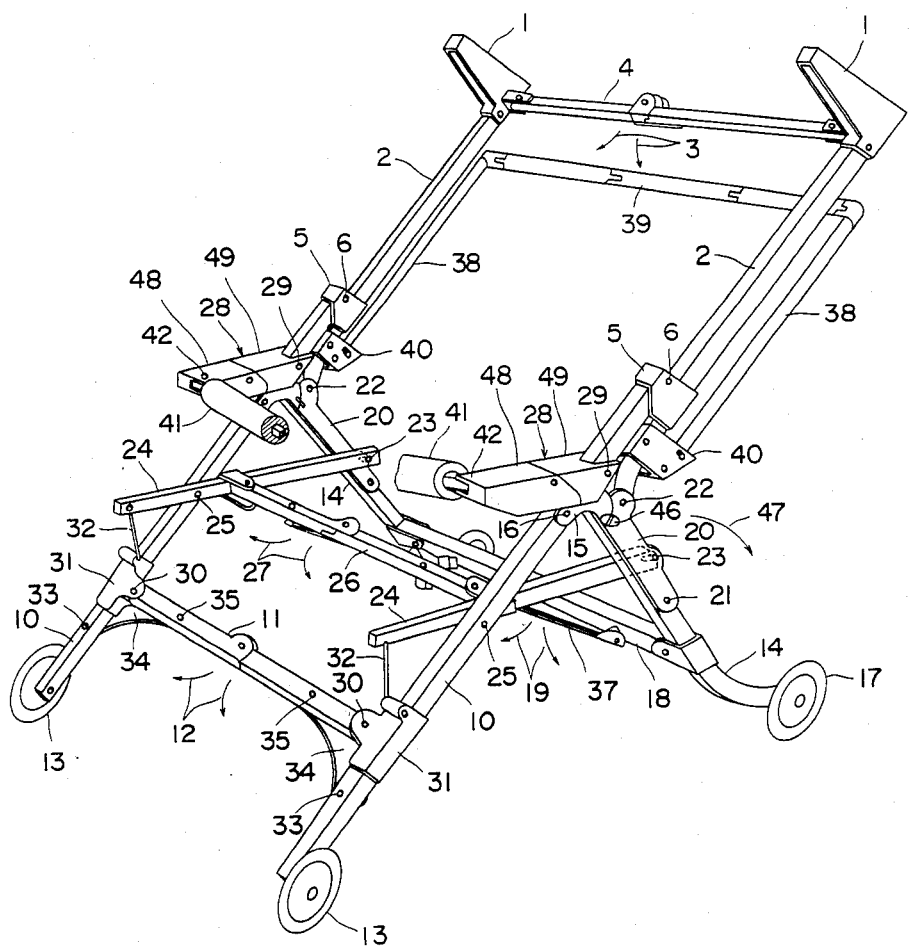
FIG. 1 is a perspective view showing the opened or unfolded state of a baby carriage incorporating an embodiment of this invention.

Referring to FIGS. 1 and 2, grip portions 1 for a person who manually pushes the baby carriage, are provided on the upper ends of a pair of pusher bars 2. Further, the upper ends of the pair of pusher bars 2 are interconnected by a pusher bar connecting bar 4 which is foldable as indicated by arrows 3. The pusher bars 2 are curved in their lower portions, but their straight portions serve to guide the slide movement of slide turning connecting members 5. The slide turning connecting members 5 have the upper ends of front legs 10 pivotally connected thereto through pivot pins 6. The front legs 10 on both sides are interconnected by a front leg connecting bar 11 for reinforcement purposes. The front leg connecting bar 11 is foldable as indicated by arrows 12. The lower ends of the front legs 10 are provided with rotatable front wheels 13. Rear legs 14 are connected to the longitudinally intermediate portions of the front legs 10. More particularly, an interlocking lever 15 is fixed to the upper end of each rear leg 14 and a pivot pin extending through said interlocking lever 15 is attached to the associated front leg 10, whereby the rear leg 14 is turnably connected to the front leg 10. The lower ends of the rear legs 14 are rotatably provided with rear wheels 17. The rear legs 14 on both sides are interconnected by a rear leg connecting bar 18 for reinforcement purposes. The rear leg connecting bar 18 is foldable as indicated by arrows 19. One end of a support bar 20 is turnably connected to the longitudinally intermediate portion of each rear leg 14 through a pivot pin 21. The other end of the support bar 20 has the lower end of the pusher bar 2 turnably connected thereto through a pivot pin 22. Longitudinal connecting bars 24, which extend in the horizontal direction, are turnably connected to the front legs 10 by pivot pins 25 in a region where they cross the front legs. The rear end of each bar 24 is pivoted at 23 to the support bar 20. Each horizontal connecting bar 24 has a portion which further extends beyond the front leg 10. The connecting bars 24 on both sides are interconnected by a middle transverse connecting bar 26. The middle transverse connecting bar 26 is foldable as indicated by arrows 27.

Handrails 28 or rather armrests 28 are projecting forwardly from the front legs 10 and characterize this invention. The handrails or armrests 28 are attached to the front legs 10 by fixed pins 29.

The opposite ends of the front leg connecting bar 11 are pivotally connected to sliders 31 through pivot pins 30. The sliders 31 are slidably installed on the front legs 10. A bar link 32 is connected between each slider 31 and the front end of each longitudinal connecting bar 24. Arms 34 are turnably connected to the front legs 10 through pivot pins 33. By means of pivot pins 35 positioned at the front ends of the arms 34 and spaced a predetermined distance apart from the respective ends of the front leg connecting bar 11, the arms 34 and the front leg connecting bar 11 are turnably connected together.

An interlocking link 37 is connected between the middle transverse connecting bar 26 and the rear leg connecting bar 18. The interlocking link 37 operatively associates the folding of the middle transverse connecting bar 26 in the direction of arrows 27 with the folding of the rear leg connecting bar 18 in the direction of arrows 19.

The arrangement relating to the seat for placing a baby in this baby carriage will now be described. Backrest holder bars 38 for holding the backrest (not shown) which is part of this seat extend along the pusher bars 2. The upper ends of the backrest holder bars 38 are interconnected by a foldable backrest connecting bar 39. Further, the seat portion (not shown) of the seat is installed on the longitudinal connecting bars 24 and middle transverse connecting bar 26 by utilizing them. The lower ends of the backrest holder bars 38 are connected to reclining adjusting elements 40 attached to the pusher bars 2, whereby the reclining state is made adjustable. Further, a torso guard may be provided which connects the front ends of the pair of handrails 28. The torso guard 41 is inserted at their opposite ends into recesses formed in the front ends of the handrails 28 and turnably attached thereto by pivot pins 42.

The torso guard 41 shown in FIG. 3 comprises a core bar 43 and a cushion material 44 positioned to cover said core bar. The cushion material 44 is an elastic and bendable material. The core bar 43 has foldable hinges 45 at two longitudinally spaced places for bringing the torso guard 41 into the folded position shown in FIG. 2.

The collapsing operation of this baby carriage will now be described.

A locking member 46 of conventional construction shown in FIGS. 1 and 2 will be manipulated, for exampled pulled to cancel the locking of the opened state of the baby carriage. Then, the operator grasps the grip portions 1 and lifts the baby carriage above the ground, whereby the support bars 20 aided by gravity are turned in the direction of arrow 47 about the pivot pin 21 until the position shown in FIG. 2 is reached. Then with the rear wheels 17 kept in contact with the ground, the operator tilts the entire baby carriage backward to lift the front wheels 13 off the ground and pushes the grip portion 1 downwardly. The force for pushing down the grip portions 1 is preferably imparted to the middle of the pusher bar connecting bar 4 for folding of the pusher bar connecting bar 4 in the direction of arrows 3. As a result of pushing down the grip portion 1, the pusher bars 2 slide down in the connecting members 5 to a lower position, while the slide turning connecting members 5 slide upwardly on the pusher bars 2. In response to this downward movement of the pusher bars 2, the front leg connecting bar 11 is folded in the direction of arrows 12. In response to this folding of the front leg connecting bar 11, the pair of front legs 10 are moved toward each other. Further, substantially simultaneously therewith, the movement of the pair of pusher bars 2 toward each other, the movement of the pair of rear legs 14 toward each other, the movement of the rear legs 14 toward the front legs 10 and the folding of the foldable connecting bar 39 take place. This results in the movement of the rear leg connecting bar 18 and middle transverse connecting bar 26 toward each other, while they are folded in the directions of arrows 19 and 27, respectively. Finally, the state shown in FIG. 2 is established; thus, the closed or folded state of the baby carriage is obtained.

To change this closed state to the opened state, all that is necessary is to hold the middle portion of the pusher bar connecting bar 4 to lift the entire baby carriage. In response thereto, the weight of the baby carriage works enough to turn the support bars 20 around the axes of the pivot pins 22 at the lower ends of the pusher bars 2. At the same time, the slide turning connecting members 5 slide downwardly on the pusher bars 2. In response thereto, the longitudinal connecting bars 24 are turned until they are substantially horizontal. In response thereto, the front leg connecting bar 11 extends straight, moving the pair of front legs away from each other. Further, substantially simultaneously therewith, the rear legs 14 are turned to move away from the front legs 10. In response thereto, the rear leg connecting bar 18 and middle transverse connecting bar 26 are extended straight in an interlocked manner by the action of the interlocking link 37. As a result of such operation, the pair of pusher bars 2, the pair of rear legs 14 and the pair of longitudinal connecting bars 24 are moved to spread widthwise. In this way, the opened state of the baby carriage is reestablished.

The handrails or armrests 28 according to one embodiment of this invention will be collapsed by making use of the fact that in the collapsing operation of the baby carriage described above, in the opened state the rear legs 14 have been turned away from the front legs 10 and in the closed state the rear legs 14 have been turned toward the front legs 10.

Figure 4:
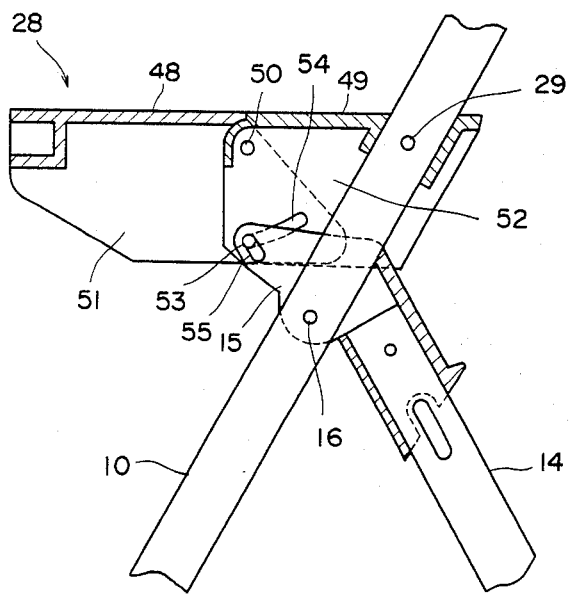
FIG. 4 is a side view, partly in section, showing how a handrail according to an embodiment of this invention is installed.
Figure 5:
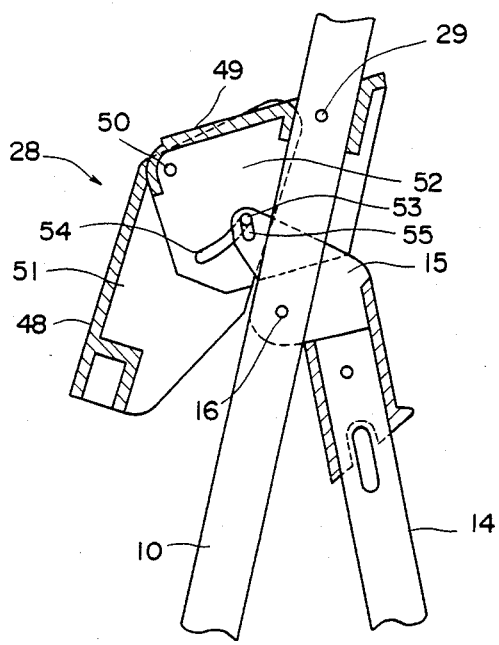
FIG. 5 is a side view, partly in section, showing the attitude of the handrail when the baby carriage is closed.

Referring to FIGS. 4 and 5 the hand rail or armrest 28 of the invention is divided into a front member 48 and a rear member 49. The aforesaid fixed pin 29 fixes the rear member 49 to the front leg 10. The front member 48 is turnably connected to the rear member 49 by an armrest or handrail pivot pin 50 extending widthwise of the baby carriage. Thereby, the handrail 28 itself is made collapsible. The vertical wall 51 of the front member 48 and the vertical wall 52 of the rear member 49 are formed with portions which overlap each other. In such overlapping portions, a turning control pin 53 located spaced by a predetermined distance from the handrail or armrest pivot pin 50 and extending substantially parallel to the pivot pin 50 is provided on the vertical wall 51 of the front member 48. The vertical wall 52 of the rear member has an elongated guide hole or first cam track 54 along an arc having a center of curvature at the handrail pivot pin 50 and a radius equal to said predetermined distance. The aforesaid turning control pin 53 is received in this elongated guide hole. The rear member 49 is positioned above the level of the pivot pin 16 which connects the front leg 10 to the interlocking lever 15 which turnably connects the rear leg 14 to the front leg 10. The interlocking lever 15 extends above the pivot pin 16 and has an engaging hole or second cam track 55 at its end. The engaging hole 55 receives the turning control pin 53. The engaging hole or cam track 55 is preferably an elongated hole extending in a direction crossing the elongated guide hole 54 or first cam track, thereby accommodating changes in the distance between the turning control pin 53 and the pivot pin 16 which are produced when the turning control pin 53 is displaced along the elongated guide hole 54.

In the opened state of the baby carriage shown in FIG. 4, since the rear leg 14 has been turned away from the front leg 10, the engaging hole or second cam track 55 has brought the turning control pin 53 to the illustrated leftmost position, thereby horizontally aligning the front member 48 with the rear member 49 to form the armrest 28.

When this state is changed to the state shown in FIG. 5 wherein the baby carriage is closed or folded, the rear leg 14 has been turned toward the front leg 10. In the process so far, the turning control pin 53 engaged in the engaging hole 55 is displaced to the right in the illustration along the elongated guide hole or cam track 54 and in response thereto the front member 48 is turned counterclockwise with respect to the rear member 49 around the axis of the handrail or pivot pin 50. Finally, the turning control pin 53 is brought to the rightmost position in the elongated guide hole 54 as shown in FIG. 5, and the front member 48 assumes a position in which it substantially extends along the front leg 10.

For opening or unfolding the carriage the described operation takes place in the reverse order, thus, the turning control pin 53 moves as it is guided by the turning movement of the rear leg 14 while engaging in the engaging hole 55, until the front member 48 assumes the state shown in FIG. 4.

In this embodiment, the torso guard 41 is provided, as described previously. When the baby carriage is closed, the distance between the opposite ends of the torso guard 41 is decreased, so that it projects outwardly of the handrail or armrest 28. However, as best shown in FIG. 2, even if the torso guard 41 projects in this manner, since the front member 48 extends along the front leg 10, the torso guard can be snugly received within the confines of the closed baby carriage.

Figure 6:
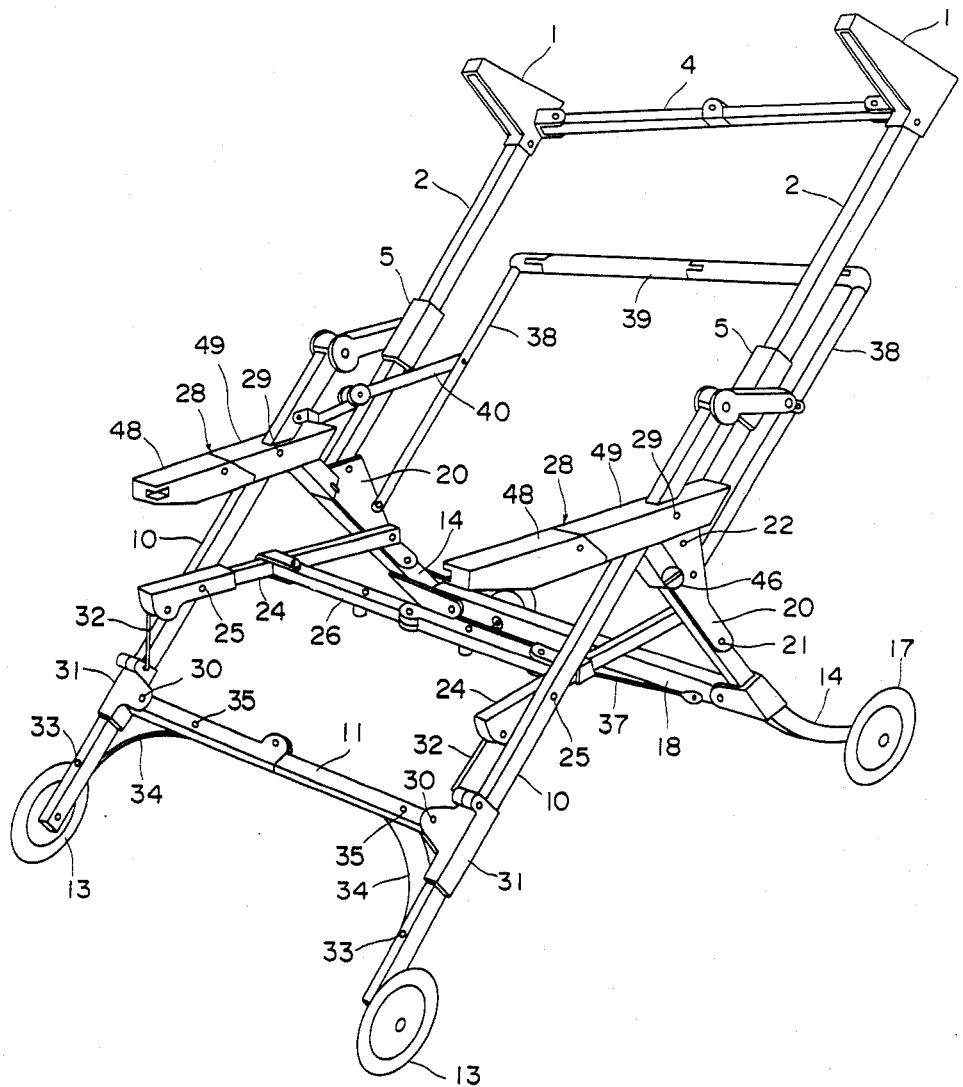
FIG. 6 is a perspective view showing the opened or unfolded state of a baby carriage employing another embodiment of this invention.

The baby carriage shown in FIG. 6 illustrates another embodiment of the invention. Compared to the baby carriage shown in FIG. 1, the embodiment of FIG. 6 has a relatively large clearance defined backwardly of the front legs 10 between the latter and the pusher bars 2. This baby carriage is constructed so that it can be used also when the pusher bars 2 are tilted forwardly from the FIG. 6 state so that the operator sees face-to-face the baby sitting in the baby carriage while pushing the latter. The rest of the arrangement is substantially the same as that shown in FIG. 1; thus, the same reference numerals are applied to the same parts and a detailed description thereof is omitted.

Figure 7:
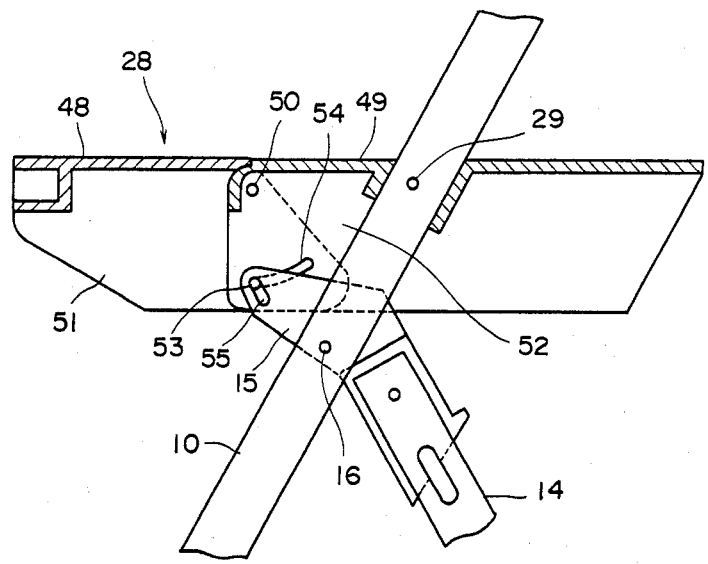
FIG. 7 is a side view, partly in section, showing how the handrail according to the second embodiment of the invention is installed.
Figure 8:
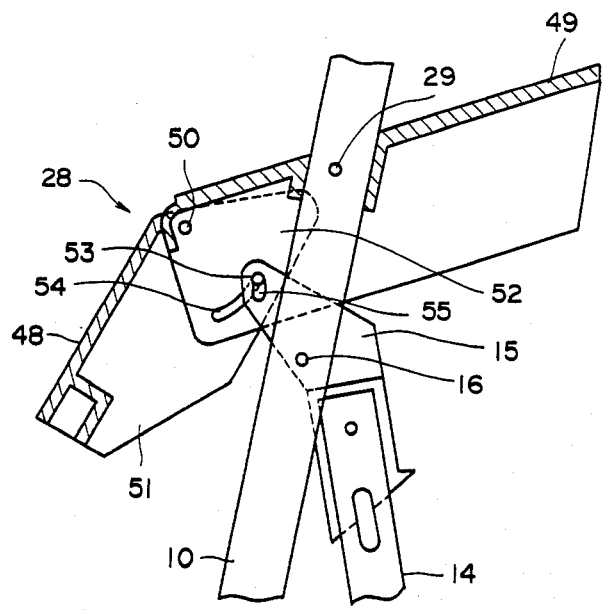
FIG. 8 is a side view, partly in section, showing the closed state of the baby carriage using this handrail.

In the embodiment of FIGS. 7 and 8, the rear member 49 of the handrail or armrest 28 is further extended backwardly from the front leg 10 to span said clearance between the front leg 10 and the pusher bar 2. However, the rest of the arrangement and the operation are the same as those described with reference to the preceding embodiment; thus, again the same reference numerals are applied to the same parts and the description given above shall apply.

This invention has been described so far with reference to some embodiments thereof. The baby carriages to which this invention is applicable may be constructed, as in the baby carriages described above, so that in the collapsing operation the baby carriage can be collapsed also widthwise or it may be collapsed while maintaining a predetermined widthwise dimension from one armrest 28 to the other.

While the handrail or armrest 28 has been constructed so that it is collapsed together with the collapsing movement of the baby carriage, the collapsing of the handrail may be independently effected if desired. For example, before the baby carriage main body is collapsed, the handrails may be manually collapsed, followed by the collapsing of the baby carriage main body. Even in such case, the problem which arises with handrails or armrests projecting outside the confines of the collapsed baby carriage can be advantageously solved. Further, as for the direction of turning the front member of the handrail or armrest, it may be turned upwardly rather than downwardly as in the illustrated embodiments.

Further, it is to be pointed out that in each of the illustrated embodiments, the elongated guide hole 54 formed in the vertical wall 52 of the rear member 49 is not absolutely necessary. This elongated guide hole 54 serves to enable the front member 48 to be smoothly turned, but even if such elongated guide hole 54 is not provided, the turning movement of the front member 48 can be operatively associated with the collapsing movement of the baby carriage main body so long as the arrangement is such that the turning control pin 53 engages in the engaging hole 55.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage with armrests, said baby carriage including a main body, said armrests projecting forwardly from said baby carriage main body and positioned on each side of a baby sitting in the baby carriage, comprising an armrest front member (48) including horizontal and vertical first wall elements, and an armrest rear member (49) including horizontal and vertical second wall elements, first connecting means (29) operatively securing said rear member (49) to said main body (10) of said baby carriage, second connecting means (50, 53) for operatively connecting said front member (48) in a pivotable manner to said rear member (49), said second connecting means including an armrest pivot pin (50) extending widthwise of the baby carriage, said first wall elements of said armrest front member (48) and said second wall elements of said armrest rear member (49) forming respective channel components partially overlapping each other, third connecting means including a pivot control pin (53) secured to one of said vertical first wall elements (51) of said armrest front member (48) in a position spaced a predetermined distance apart from said armrest pivot pin (50) and extending substantially parallel to said armrest pivot pin (50), wherein said armrest rear member (49) comprises a first elongated guide cam track (54) extending in one of said vertical second wall elements of said armrest rear member (49) along an arc having a center of curvature located at said armrest pivot pin (50), said arc having a radius equal to said predetermined distance, said pivot control pin (53) being received in said elongated guide cam track (54), said third connecting means further including an interlocking lever (15) connected to said main body in a position for cooperation with said pivot control pin (53), said interlocking lever (15) comprising a second cam guide track (55) for engagement with said pivot control pin (53), whereby said pivot control pin (53) cooperates with said first and second cam tracks (54, 55), thereby making said armrest (28) itself collapsible.

2. The baby carriage of claim 1, further comprising collapsible means as part of said baby carriage main body for collapsing said main body, said collapsible means of said main body including front legs (10), and rear legs (14) extending rearwardly, pivot pins (16) connecting said rear legs to said front legs so that said rear legs are pivotable relative to said front legs in response to a collapsing movement, said first and second connecting means assuring that a collapsing pivoting movement of said front member (48) of said armrest (28) relative to said rear member (49) of said armrest (28) is caused by a relative pivoting collapsing movement of said front legs (10) and said rear legs (14).

3. The baby carriage of claim 1, wherein said second guide track (55) is an elongated hole extending in a direction crossing the direction in which said first guide cam track (54) extends.

4. The baby carriage of claim 2, wherein said pivot pins (16) connect said rear legs to said front legs at a given elevational level, said first connecting means (29) securing said armrest rear member (49) to said front legs (10) at an elevational level higher than said given elevational level.

5. The baby carriage of claim 4, wherein said interlocking lever (15) is fixed to said rear leg (14) and extends above said given elevational level defined by said pivot pins (16).

* * * * *